(12) United States Patent
Romanov et al.

(10) Patent No.: US 6,992,295 B2
(45) Date of Patent: Jan. 31, 2006

(54) PET SCANNER WITH STRUCTURED OPTICAL ELEMENT

(75) Inventors: Leonid Romanov, Boxboro, MA (US); Paul Domigan, Andover, MA (US); Olof Johnson, Ashburnham, MA (US)

(73) Assignee: PhotoDetection Systems, Inc., Acton, MA (US)

( * ) Notice: Subject to any disclaimer, the term of this patent is extended or adjusted under 35 U.S.C. 154(b) by 160 days.

(21) Appl. No.: 10/695,264

(22) Filed: Oct. 27, 2003

(65) Prior Publication Data

US 2005/0087692 A1 Apr. 28, 2005

(51) Int. Cl.
*G01T 1/164* (2006.01)

(52) U.S. Cl. ............... 250/363.03; 250/363.01; 250/361 R; 250/336.2; 250/336.1

(58) Field of Classification Search ........... 250/363.03, 250/363.01, 361 R, 336.2, 336.1
See application file for complete search history.

(56) References Cited

U.S. PATENT DOCUMENTS

| | | | |
|---|---|---|---|
| 4,749,863 A | | 6/1988 | Casey et al. |
| 5,719,400 A | * | 2/1998 | Cherry et al. ............... 250/368 |
| 5,783,829 A | * | 7/1998 | Sealock et al. ............. 250/367 |
| 6,362,479 B1 | * | 3/2002 | Andreaco et al. ........... 250/366 |
| 6,462,341 B1 | * | 10/2002 | Muehllehner .......... 250/363.03 |
| 6,828,564 B2 | * | 12/2004 | Worstell et al. ............. 250/394 |
| 2004/0004188 A1 | * | 1/2004 | Tai ........................ 250/363.03 |

* cited by examiner

*Primary Examiner*—David Porta
*Assistant Examiner*—Christine Sung
(74) *Attorney, Agent, or Firm*—Fish & Richardson P.C.

(57) ABSTRACT

A PET scanner includes a scintillator block and a plurality of photodetectors, each of which has a field of view that includes a portion of the scintillator block. An optical element is disposed between the scintillator block and the plurality of photodetectors. The optical element has a first layer and a second layer. The first layer has a central region and a peripheral region separated by a first gap. The second layer has at least a first region and a second region separated by a second gap.

57 Claims, 14 Drawing Sheets

$$\frac{A+C}{(A+C)+(B+D)}$$

$$\frac{B+D}{(A+C)+B+D}$$

$A+B+C+D$

PET SCANNER WITH STRUCTURED OPTICAL ELEMENT

FIELD OF INVENTION

This invention relates to positron emission tomography ("PET") systems, and in particular, to enhancing spatial resolution of a PET system.

BACKGROUND

In positron emission tomography ("PET"), a radioactive material is placed in the patient. In the process of radioactive decay, this material emits positrons. These positrons travel through the patient until they encounter electrons. When a positron and an electron meet, they annihilate each other. This results in emission of two gamma ray photons traveling in opposite directions. By detecting these gamma ray photons, one can infer the distribution of the radioactive material within the patient.

Certain materials, referred to as scintillating crystals, emit an isotropic spray of scintillation photons centered at a point at which a gamma ray interacts with the material. Some of these scintillation photons are emitted in a direction that takes them to a photodetector. Other scintillation photons, which are emitted in a direction away from any photodetector, nevertheless manage to reach a photodetector after being redirected by structures within the scintillating crystal. Yet other scintillation photons are absorbed and therefore never reach the photodetector at all.

To detect gamma ray photons, the patient is positioned within a ring of scintillating crystals. Photodetectors observing the crystals can then detect the scintillation photons and provide, to a processor, information on how many coincident gamma ray photon pairs were received in a particular interval and at what location those gamma ray photon pairs originated. The processor then processes such data arriving from all photodetectors to form an image showing the spatial distribution of radioactive material within the patient.

Each photodetector provides a signal whose intensity indicates the number of scintillation photons reaching that photodetector. The resulting signal, however, does not provide precise information on where the gamma ray photon interacted with the scintillating crystal. This imprecision can limit the spatial resolution of the resulting image.

One approach to enhancing spatial resolution is to allow scintillation photons to reach more than one detector. By observing the relative numbers of scintillation photons received by each detector, it is possible to determine the location at which the gamma ray photon interacted with the scintillation crystal.

The success of this approach depends in part on controlling the distribution of scintillation photons that reach the detectors. This spatial distribution of scintillation photons can be controlled by a optical element placed between the scintillating crystal and the detectors.

SUMMARY

In one aspect according to the invention, a PET scanner includes a scintillator block and a plurality of photodetectors. A optical element is disposed between the scintillator block and the plurality of photodetectors. The optical element includes a first layer having a central region with an outer wall and a peripheral region with an inner wall separated from the outer wall by a first gap. The optical element also includes a second layer in optical communication with the first layer and having at least a first region and a second region. The first region has a first interior wall and the second region has a second interior wall opposite the first interior wall and separated therefrom by a second gap.

Embodiments of this aspect of the invention may include one or more of the following features.

The first layer has a perimeter wall, and the peripheral region is adjacent to at least a portion of the perimeter wall.

The peripheral region is adjacent to the entire perimeter wall.

The first layer has one or more additional peripheral regions, the one or more additional peripheral regions being adjacent to a portion of the perimeter wall that is not adjacent to the peripheral region.

An additional peripheral region is separated from the peripheral region by a gap.

The gap extends to the perimeter wall.

The inner wall and the outer wall have different optical characteristics.

An inner surface of the inner wall of the peripheral region has a greater reflection coefficient than an inner surface of the outer wall of the central region.

The inner surface of the inner wall is polished.

The inner surface of the outer wall is roughened.

The optical element has a third layer facing the scintillator block.

The first gap has an optical property that is different from a corresponding optical property of the central region and the peripheral region.

The first gap is an air gap.

The first interior wall and the second interior wall are specularly reflecting walls.

The second gap defines a grid of regions.

Each region in the grid of regions is positioned to correspond to a photodetector from the plurality of photodetectors.

The second gap is a cruciform gap.

According to another aspect of the invention, an optical element for directing light from a scintillator block to a plurality of photodetectors includes a first layer in optical communication with the scintillator block. The first layer has a central region having an outer wall and a peripheral region having an inner wall, the inner and outer wall being separated by a first gap. The optical element also has a second layer in optical communication with the plurality of photodetectors, and with the first layer. The second layer includes at least a first region and a second region. The first region has a first interior wall and the second region has a second interior wall opposite the first interior wall. The first and second interior walls are separated by a second gap.

Embodiments of this aspect of the invention may include one or more of the following features.

The inner wall and the outer wall are configured such that a photon incident on the inner wall from the peripheral region encounters a first reflection coefficient that is greater than a second reflection coefficient encountered by a photon incident on the outer wall from the central region.

An inner surface of the inner wall of the peripheral region has a greater reflection coefficient than an inner surface of the outer wall of the central region.

The inner surface of the inner wall is polished.

The inner surface of the outer wall is roughened.

The optical element further includes a third layer facing the scintillator block.

The first gap is an air gap.

The first interior wall and the second interior wall are specularly reflecting walls.

The second gap defines a grid of regions.

The second gap extends across the second layer.

The second gap extends part way across the second layer.

The cruciform gap has intersecting first and second arms, at least one of which extends across the second layer.

The cruciform gap has intersecting first and second arms that both extend part way across the second layer.

A mask is disposed to prevent scintillation photons emerging from selected portions of the optical element from reaching the photodetectors.

Each region in the grid of regions is positioned to correspond to a photodetector from the plurality of photodetectors.

The second gap is a cruciform gap.

According to another aspect of the invention, an optical element directs light from a scintillator block to a plurality of photodetectors. The optical element includes a first layer in optical communication with the scintillator block. The first layer has a central region having an outer wall and a peripheral region having an inner wall, the inner and outer walls being separated by a first gap. The optical element also has a second layer in optical communication with the plurality of photodetectors and with the first layer. The second layer includes at least a first region and a second region. The first region has a first interior wall and the second region has a second interior wall opposite the first interior wall. The first and second interior walls are separated by a second gap.

According to yet another aspect of the invention, a PET scanner includes a scintillator block for generating a spatial light distribution of scintillation photons in response to illumination by a gamma ray photon, means for an outer and inner the spatial light distribution of scintillation photons to generate a modified spatial light distribution, and a plurality of photodetectors for receiving the modified spatial light from the outer and inner means.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Other features and advantages of the invention will be apparent from the following detailed description, and from the claims.

DETAILED DESCRIPTION

Figure 1:
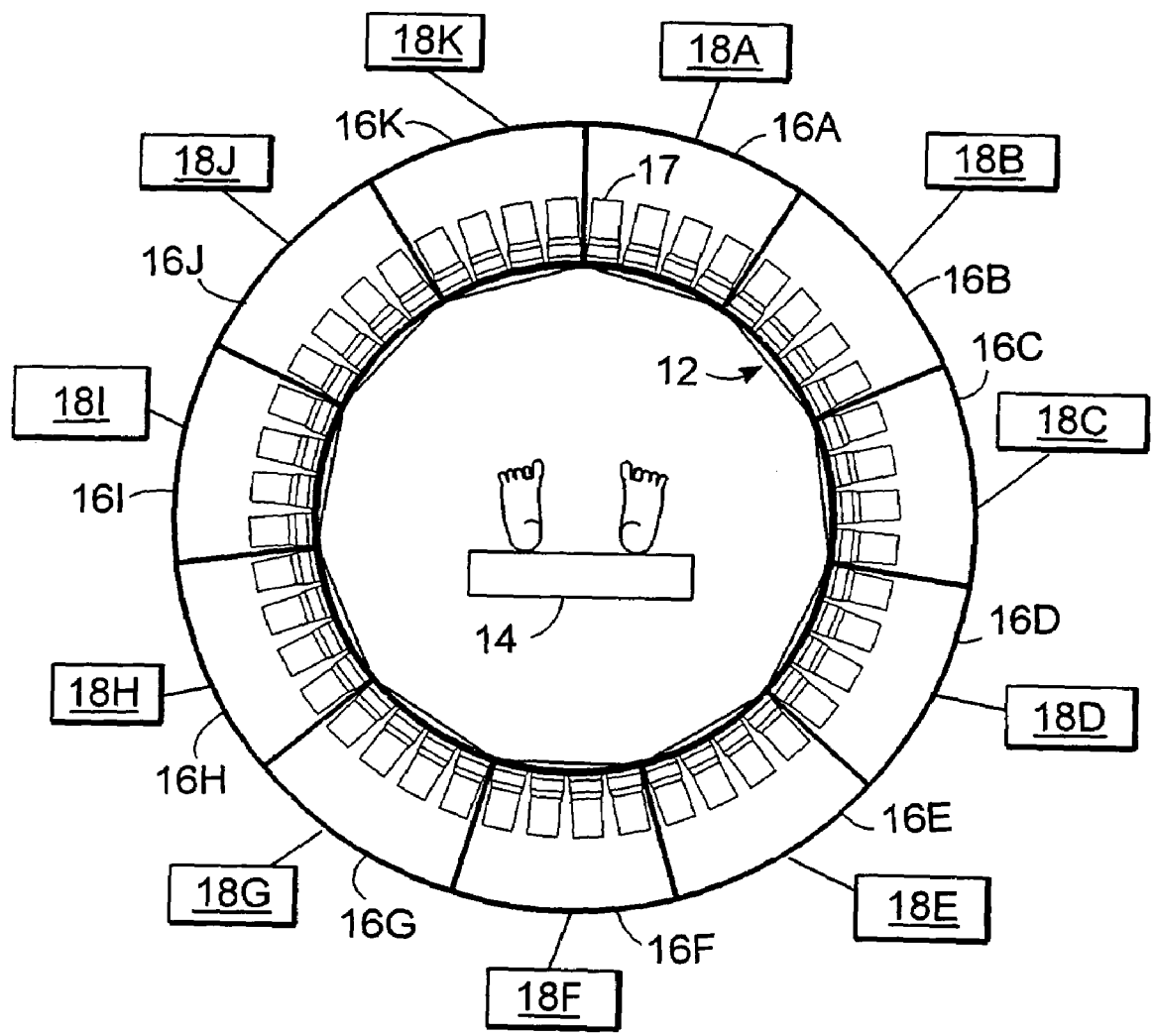
FIG. 1 shows a ring of modules.
Figure 2A:
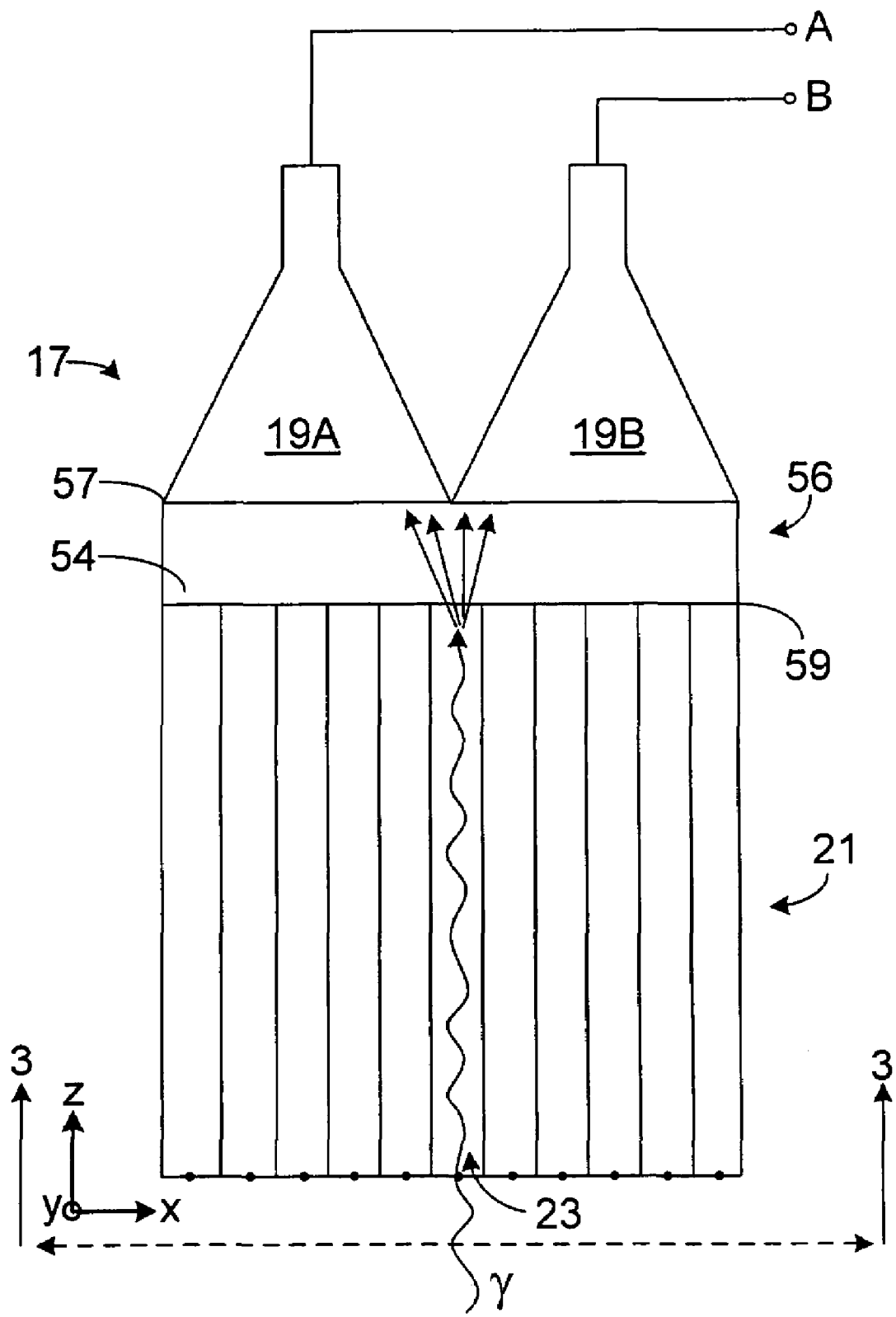
FIGS. 2A and 2B show a detector block.
Figure 2B:
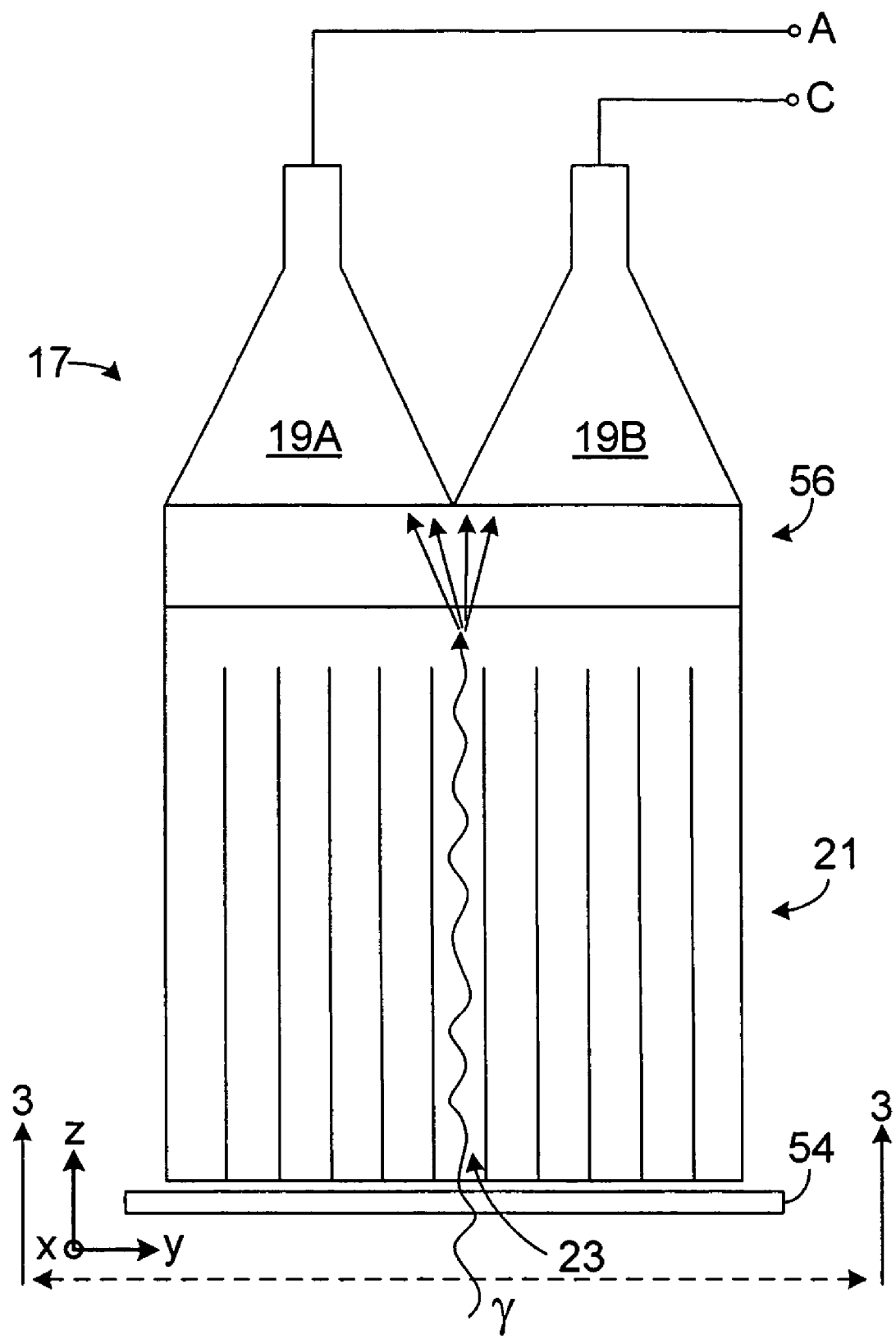

Referring to FIG. 1, a PET scanner 10 includes a ring 12 of detector modules 16A–K surrounding a bed 14 on which a patient is to lie. Each detector module 16A–K (hereinafter referred to as a "module") includes one or more rows of detector blocks 17. A detector block 17, shown in FIG. 2A, includes, for example, four photomultiplier tubes 19A–D arranged in a 2×2 array in optical communication with a scintillator block 21. The scintillator block 21 is typically made of CsI(Na) (sodium doped cesium iodide). Photomultiplier tubes 19A–B are visible in FIG. 2A and photomultiplier tubes 19A–C are visible in FIG. 2B. The remaining photomultiplier tube 19D, which lies diagonally across the array from photomultiplier tube 19A is not visible.

Figure 3:
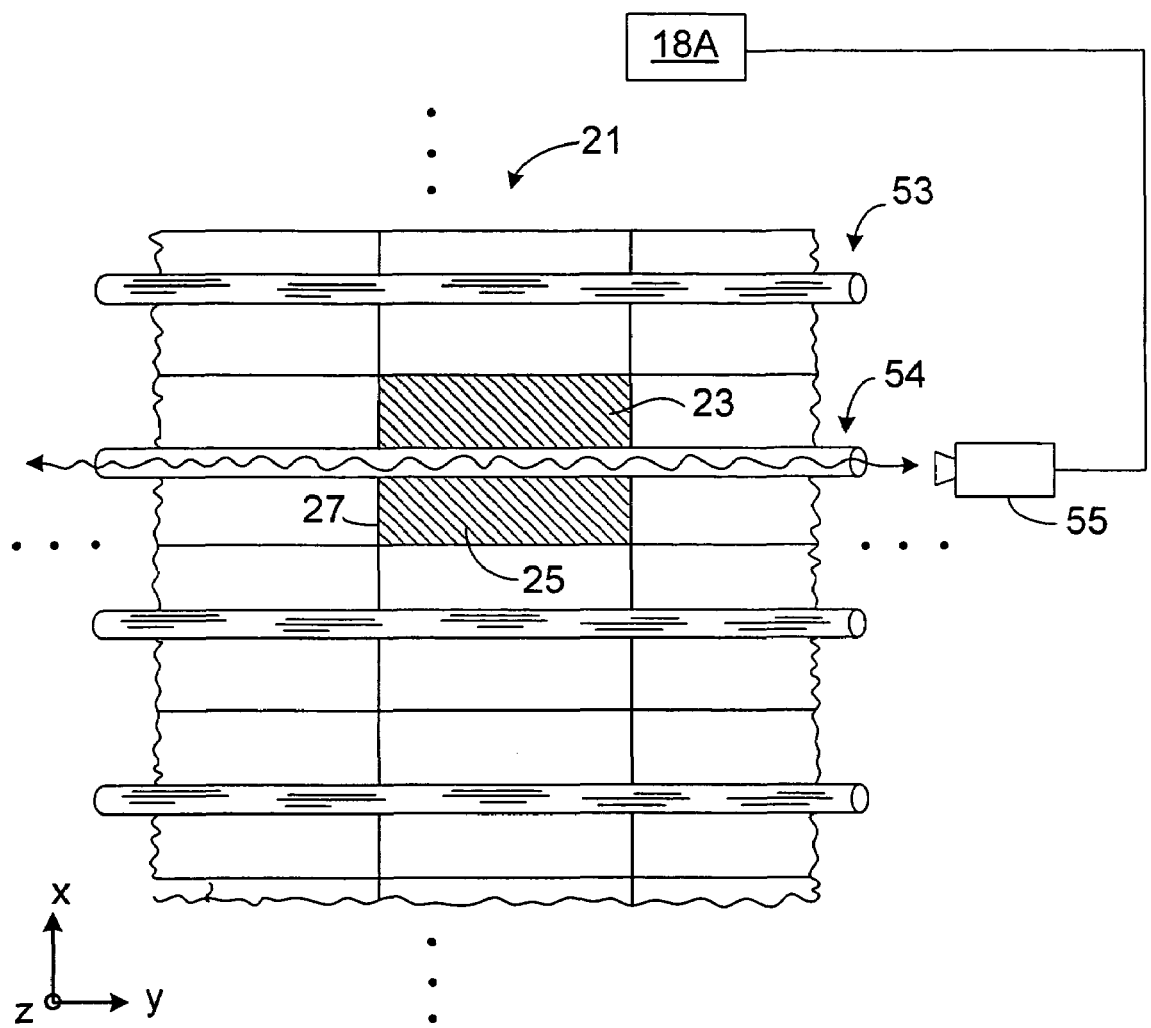
FIG. 3 shows the detector block of FIGS. 2A and 2B taken along the line 3—3.

The scintillator block 21 is divided into individual pillars 23 made of a scintillating crystal. The pillars 23 are arranged in an array, for example a 10×16 array, a portion of which is shown in FIG. 3. The array has a rectangular cross-section with a length of 3.22 inches (82 millimeters) and a width of 2.69 inches (68 millimeters).

Each pillar 23 in the array is a rectangular prism having a transverse cross-section with a long side 25 and a short side 27. The axis parallel to the long side 25 will be referred to herein as the "major" axis of the scintillator block 21, and the axis parallel to the short side 27 of the will be referred to herein as the "minor" axis of the scintillator block 21.

To image a portion of a patient with a PET scanner 10, one introduces a radioactive material into the patient. As the radioactive material decays, it emits positrons. A positron, after traveling a short distance through the patient, eventually encounters an electron. The resulting annihilation of the positron and the electron generates two gamma ray photons traveling in opposite directions. To the extent that neither of these gamma ray photons is deflected or absorbed within the patient, they emerge from the patient and strike two opposed pillars 23, thereby generating a flash of light indicative of an event. By determining from which pillars 23 the light indicative of an event originated, one can estimate where in the patient the annihilation event occurred.

In particular, referring again to FIG. 1, when one of these gamma ray photons strikes a pillar in a first detector module 16A, the other gamma ray photon strikes a pillar in a second detector module 16E, F, G, or H opposed to the first detector module. This results in two events: one at the first detector module 16A and the other at the opposed second detector module 16E, F, G, or H. Each of these events indicates the detection of a gamma ray photon. If these two events are detected at the first detector module 16A and the second detector module 16E, F, G, or H at the same time, it is likely that they indicate an annihilation occurring on a line connecting first detector module 16A and the second detector module 16E, F, G, or H. If these two events are detected at the first detector module 16A and the second detector module 16E, F, G, or H at almost the same time, it is likely that they indicate an annihilation occurring on a line connecting first detector module 16A and the second detector module 16E, F, G, or H.

It is apparent that what is of interest in a PET scanner 10 are pairs of events detected by opposed detector modules 16A, 16E–F at, or almost at, the same time. A pair of events having these properties is referred to as a "coincidence." In the course of a PET scan, each detector module 16A–K detects a large number of events. However, only a limited number of these events represent coincidences.

Associated with each detector module 16A–K is a module processor 18A–K that responds to events detected by its associated detector module 16A–K. A module processor 18A–K includes a processing element and a memory element in data communication with each other. The processing element includes a computational element containing combinatorial logic elements for performing various logical operations, an instruction register, associated data registers, and a clock. During each clock interval, the processor fetches an instruction from the memory element and loads it into the instruction register. Data upon which the instruction is to operate is likewise loaded into the associated data registers. At subsequent clock intervals, the processing element executes that instruction. A sequence of such instructions is referred to herein as a "process."

Each module processor 18A–K executes a master process and a slave process concurrently. Each module processor 18A–K is simultaneously a master of two module processors and a slave to two other module processors. As used herein, "master" shall mean a module processor 18A–K acting as a master module processor and "slave" shall mean a module processor 18A–K acting as a slave module processor. The terms "master module" and "slave module" shall be used to refer to the detector modules 16A–K associated with the master and slave respectively.

The two slaves of each master are selected on the basis of the relative locations of their associated detector modules 16A–K on the ring 12. In particular, the slaves of each master are selected to maximize the likelihood that an event detected at the master detector module and an event detected at any one of the slave detector modules form a coincidence pair.

For the configuration of eleven detector modules shown in FIG. 1, the master/slave relationship between module processors 18A–K is as follows:

| MASTER | SLAVE_1 | SLAVE_2 |
|---|---|---|
| 18A | 18E | 18F |
| 18B | 18F | 18G |
| 18C | 18G | 18H |
| 18D | 18H | 18I |
| 18E | 18I | 18J |
| 18F | 18J | 18K |
| 18G | 18K | 18A |
| 18H | 18A | 18B |
| 18I | 18B | 18C |
| 18J | 18C | 18D |
| 18K | 18D | 18E | and the slave/master relationship between module processors 18A–K is as follows:

| SLAVE | MASTER_1 | MASTER_2 |
|---|---|---|
| 18A | 18G | 18H |
| 18B | 18H | 18I |
| 18C | 18I | 18J |
| 18D | 18J | 18K |
| 18E | 18K | 18A |
| 18F | 18A | 18B |
| 18G | 18B | 18C |
| 18H | 18C | 18D |
| 18I | 18D | 18E |
| 18J | 18E | 18F |
| 18K | 18F | 18G |

Figure 4:
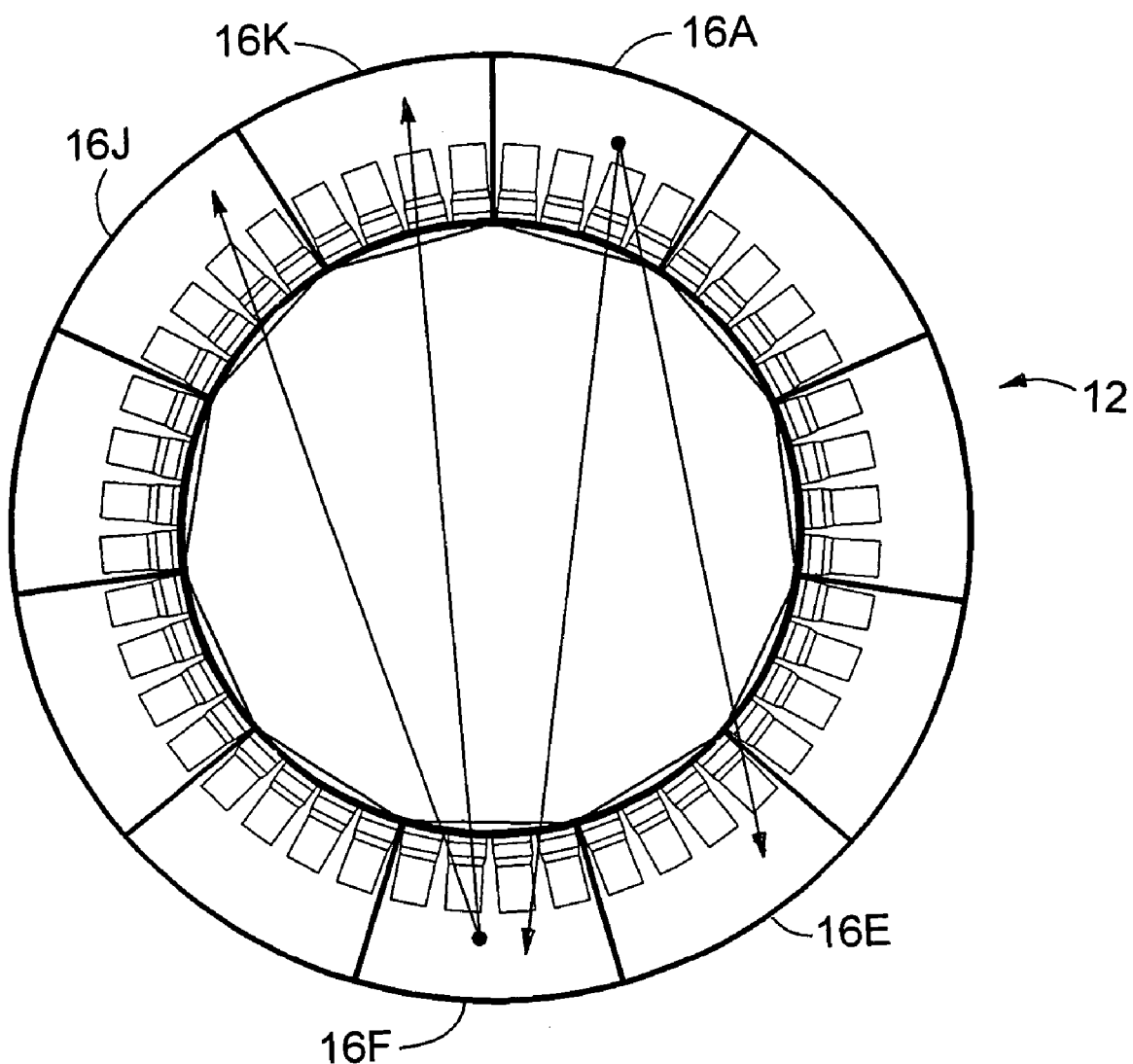
FIG. 4 shows master/slave relationships between a subset of the modules shown in FIG. 1.

FIG. 4 shows the ring 12 of FIG. 1 with lines added to show the master/slave relationships of two of the eleven module processors. The lines connecting detector modules 16A to 16E and detector modules 16A to 16F indicate that module processors 18E and 18F are slaves of module processor 18A. Module processor 18F has its own two slaves, as indicated by the lines connecting detector module 16F to detector modules 16J and 16K. The eighteen lines representing the remaining master/slave relationships are omitted for clarity.

Figure 5:
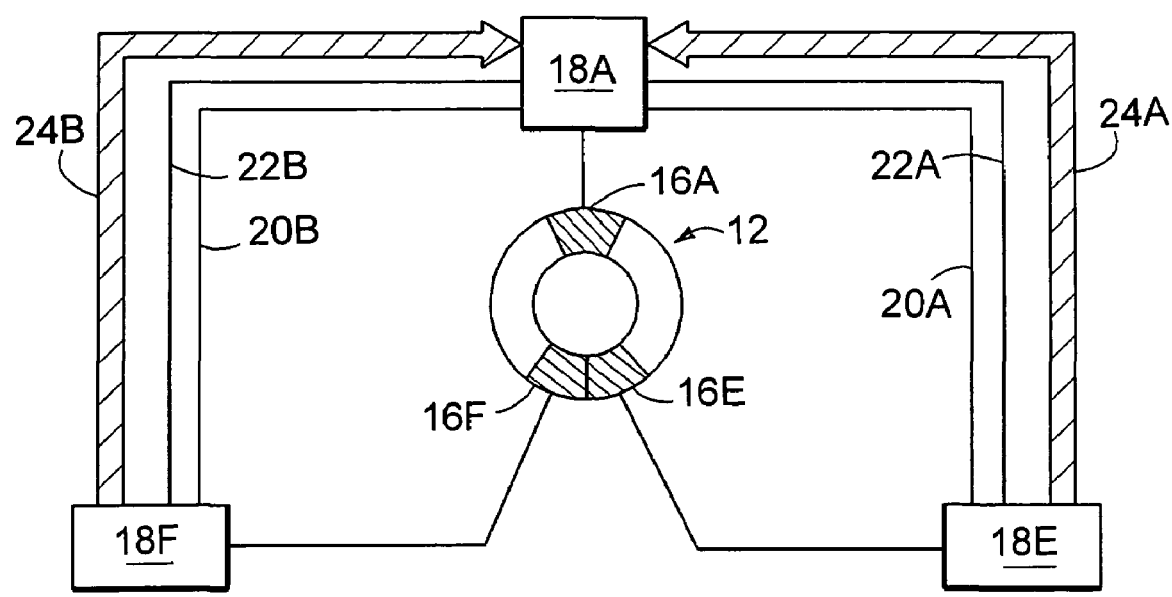
FIG. 5 shows connections between a master and its two slaves.

As shown in FIG. 5, a master 18A is connected to its first slave 18E by first and second data links 20A, 22A. Similarly, the master 18A is connected to its second slave 18F by additional first and second data links 20B, 22B. The first and second data links 20A–B, 22A–B are used to transmit trigger pulses between the master 18A and the corresponding slave 18E–F. Hence, the first and second data links 20A–B, 22A–B are typically a single wire.

When a slave 18E receives, from its associated detector module 16E, a signal indicative of an event (hereinafter referred to as a "slave event"), it transmits a pulse to the master 18A on the first data link 20A. When the master 18A considers a slave event detected by the slave 18E to be a constituent event of a coincidence, it sends a pulse back to that slave 18E on the second data link 22A.

A third data link 24A–B, which is typically an LVDS ("low-voltage differential standard") channel connects the master 18A and each of its slaves 18E–F. The slaves 18E–F use this third data link 24A–B to transmit to the master 18A additional information about slave events. Such additional information can include, for example, the energy of the incident gamma ray photon that triggered that slave event, and the waveform of the voltage signal generated by the photo multiplier tube.

Figure 6:
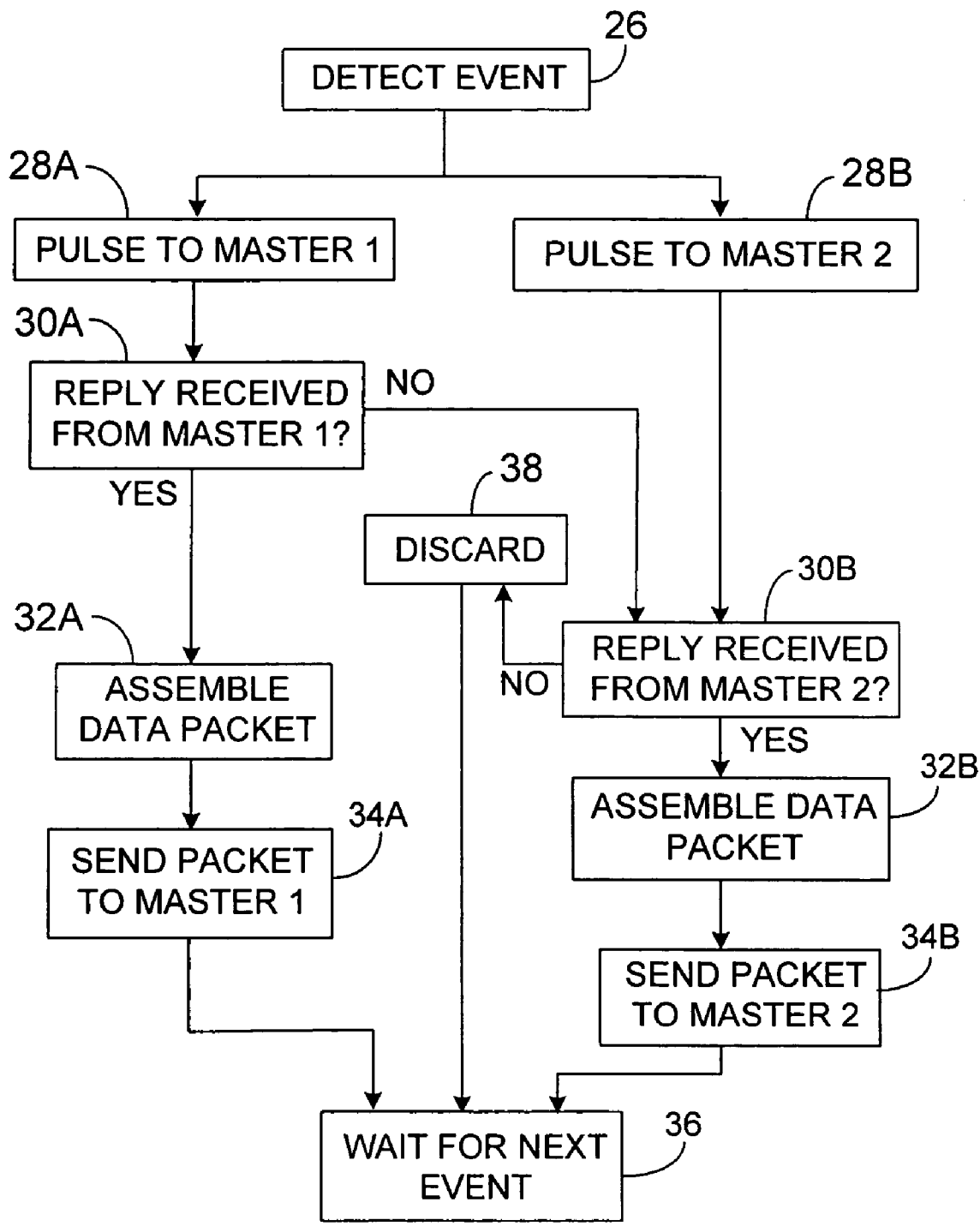
FIG. 6 is a flow-chart of a process carried out by a slave.

FIG. 6 shows the procedure carried out by a slave. Upon receiving, from its associated module processor, a signal indicative of a slave event (step 26), a slave reports the detection of that slave event to both of its respective masters (steps 28A–B). It does so by transmitting a pulse on each of two first data links that connect it to those masters. The slave then waits for a response from its masters on either of the two second data links connecting it to each of those two masters (steps 30A–B).

In response to a request pulse received on the second data link from a master, the slave prepares a data packet containing additional information about the slave event (steps 32A–B). This data packet is then transmitted on the third data link to whichever of its masters requested that additional information (steps 34A–B). After sending the data packet, the slave waits for the next event (step 36). If neither master sends a request pulse within a pre-defined time interval, the slave discards the slave event (step 38) and waits for the next slave event (step 36).

Figure 7:
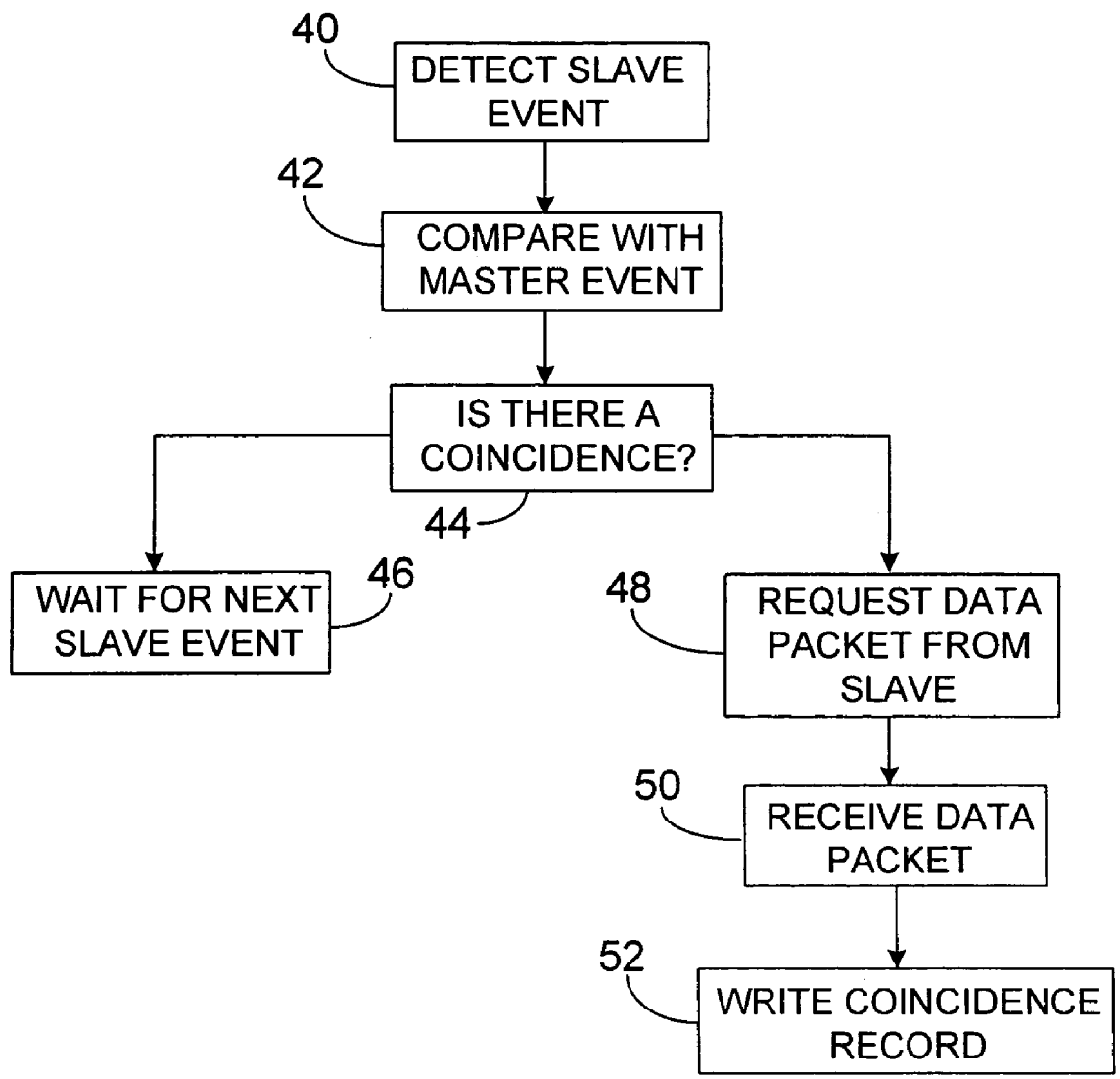
FIG. 7 is a flow-chart of a process carried out by a master.

FIG. 7 shows the procedure carried out by a master. Upon receiving, from its associated detector module, a signal indicative of a slave event (step 40), the master compares the occurrence time of that slave event with occurrence times of events (hereinafter referred to as "master events") received by its own associated detector module (step 42). If the occurrence times of a master event and a slave event differ by no more than a selected tolerance, the master considers that master event and that slave event to be a coincidence (step 44). Otherwise, the master ignores the slave event and waits for the next slave event (step 46).

Upon recognizing a coincidence between a master event and a slave event, the master transmits a request pulse to whichever slave detected that slave event (step 48). As described in connection with FIG. 6, this pulse is interpreted by the slave as a request for additional information about that slave event. The master then waits for the data packet containing additional information about the slave event.

Upon receiving the data packet (step 50), the master creates a coincidence record that includes information about the master event and the slave event that together make up the coincidence. This coincidence record is stored on a mass storage medium, such as a magnetic disk or a magnetic tape, (step 52) for later processing by an image-reconstruction process executing known tomography algorithms.

As described herein, each slave has two masters and each master has two slaves. However, there is no requirement that a slave have a particular number of masters or that a master have a particular number of slaves. Nor is there a requirement that each master have the same number of slaves or that each slave have the same number of masters.

The illustrated PET scanner 10 has eleven detector modules. However, a different number of detector modules can be used. The invention does not depend on the number of detector modules in the ring 12. It is topologically convenient, however, to have an odd number of detector modules.

In FIG. 6, the slave notifies the master of an event but withholds the information about the event until the master actually requests that information. This minimizes the probability that the third data link will be busy ferrying data packets from the slave to the master, thereby minimizing the probability that a data packet will be dropped. However, it also imposes some additional complexity since the master must now request data packets of interest.

Alternatively, the slave sends the master a data packet for each event detected at that slave's associated detector module. If the master does not consider the event to be part of a coincidence, it simply discards the data packet. This eliminates the need for the second data link since the master no longer has to signal the slave to send a data packet.

Referring back to FIGS. 2–3, each detector block 17 also includes wavelength-shifting optical fibers 54 extending parallel to the major axis of each row of pillars on the scintillator block 21. The fibers 54 are spread across the face of the scintillator block 21 nearest the object being imaged, as shown in FIG. 3, with one fiber 54 extending parallel to the major axis of each row of pillars 23. Each fiber 54 is in optical communication with a detector 55 that provides a signal to a respective processor 18A–K.

The walls of the fibers 54 are transparent to light emerging from the pillars 23. As a result, light that originates in one of the pillars 23 (the shaded pillar in FIG. 3) adjacent to a fiber 54 will introduce light into that fiber 54. A portion of this light is trapped within the fiber 54 and guided to the detector associated with that fiber 54. By observing the spatial distribution of light across the detectors, and hence across the fibers 54, the processor 18A–K can determine from which row of pillars 23 of the scintillator block 21 the light originated. A PET scanner incorporating a ribbon of fibers 54 in this manner is fully described in U.S. Pat. No. 5,600,144, the contents of which are herein incorporated by reference in their entirety.

The fibers 54 extending across the scintillator blocks 21 provide information on only one of the two spatial coordinates required to identify the particular pillar 23 within the scintillator block 21 from which scintillation photons were emitted. A second coordinate is determined by the spatial distribution of light received by the photomultiplier tubes 19A–D.

The spatial resolution in the second coordinate depends, in part, on the number of photomultiplier tubes 19A–D. Because of the expense of photomultiplier tubes, it is desirable to reduce the number of photomultiplier tubes while maintaining adequate spatial resolution. This is achieved by a providing a light mixer 56 positioned between the photomultiplier tubes 19A–D from the scintillator block 21.

The light mixer 56 is a layer of optically transparent material. An interface 59 between the scintillator block 21 and the light mixer 56 can be coated with an index-matching layer to reduce reflections at that interface 59. Similarly, an interface 57 between the light mixer 56 and the photomultiplier tubes 19A–D can be coated with an index-matching layer to reduce reflections at that interface 57.

A gamma ray photon entering a pillar 23 generates an isotropic spray of scintillation photons. These scintillation photons are scattered or reflected by structures within the optical element. Depending on which pillar the scintillation photons originate from, different numbers of scintillation photons strike the photomultiplier tubes 19A–D. As a result, the first, second, third and fourth photomultiplier tubes 19A–D generate corresponding first, second, third and fourth photomultiplier signals that depend on the number of scintillation photons detected by that photomultiplier tube 19A–D.

Ideally, the ratio of the sum of the first and third photomultiplier signals and the sum of all four photomultiplier signals depends linearly on the value of the second coordinate associated with the pillar 23 that emitted the light. Similarly, the ratio of the sum of the first and second photomultiplier signals and the sum of all four photomultiplier signals depends linearly on the value of the first coordinate associated with the pillar 23 that emitted the light. Exemplary ideal ratios are shown by the solid lines 58, 60 in FIGS. 8A and 8B. In addition, the sum of all four photomultiplier signals should be the same, no matter which pillar 23 emits the light, as shown by the solid line 62 in FIG. 8C.

Figure 8A:
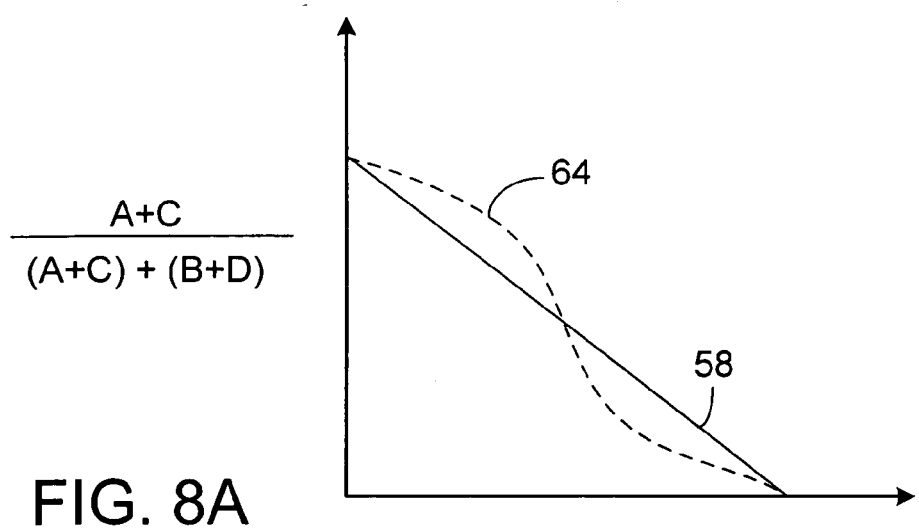
FIGS. 8A–C show exemplary response curves for detector blocks.
Figure 8B:
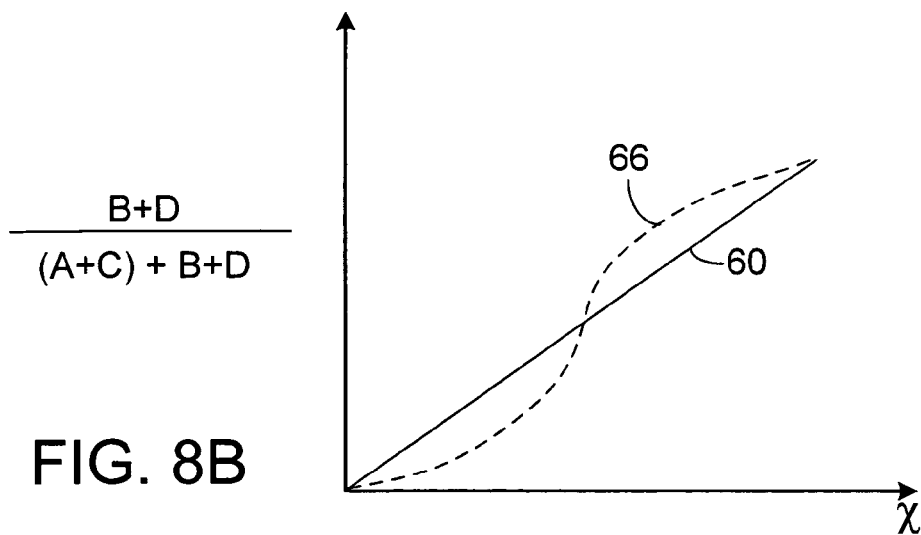
Figure 8C:
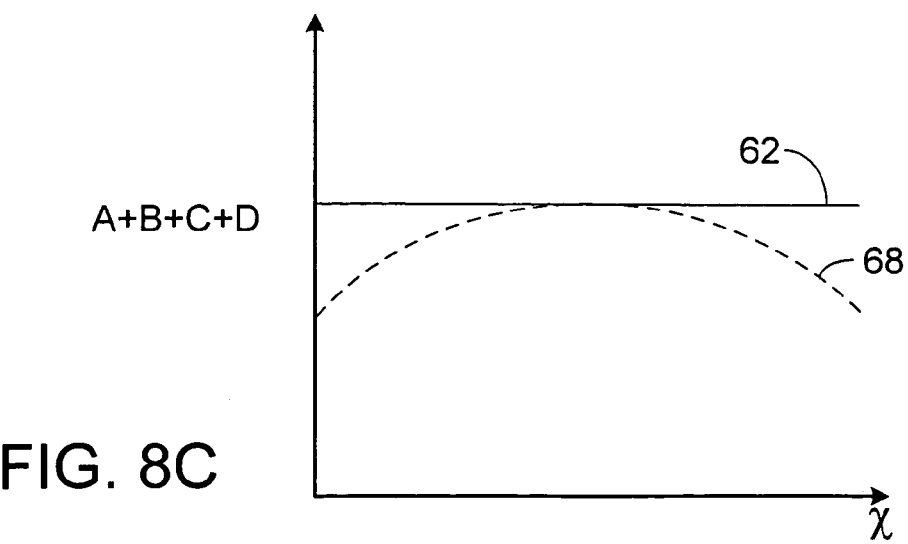

The shape of the curves shown in FIGS. 8A–C can be controlled, to some extent, by changing the properties of the light mixer 56. For example, in the case of the light mixer of 56, which is a layer of transparent material, there is a tendency for the ratio to be sigmoidal and for the sum to exhibit crowning, as shown by the dashed lines 64, 66, 68 in the three graphs of FIG. 8A–C.

In principle, if one knew the shape of the dashed lines 64, 66, 68, one could compensate for non-linearity and crowing by creating a look-up table during a calibration procedure. Entries in the look-up table would correctly map a measured value to a coordinate associated with the emitting pillar 23. However, to avoid the need to create a look-up table, and to thereby simplify the calibration procedure, it is desirable to avoid both non-linearity and crowning.

Figure 9:
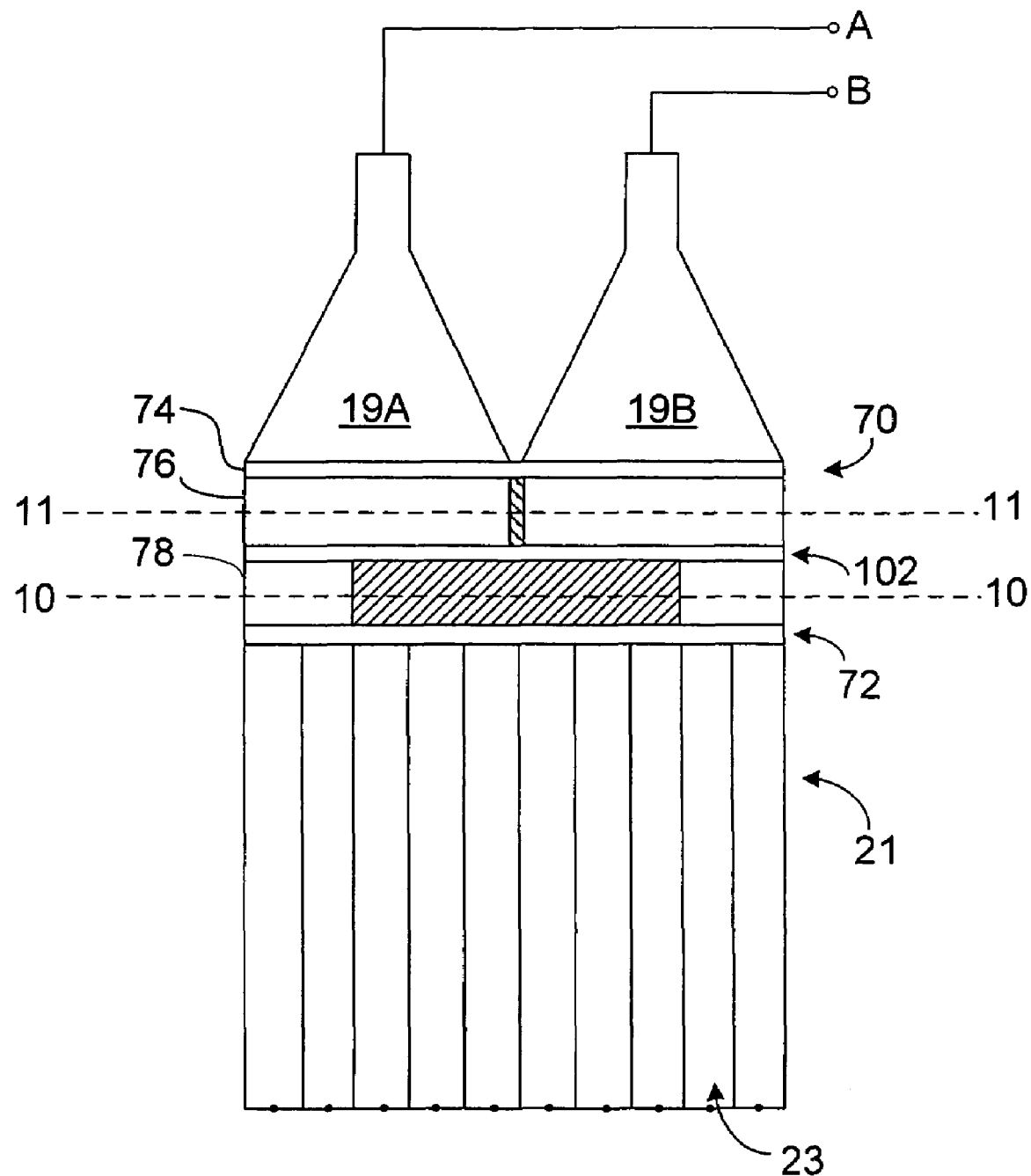
FIG. 9 is a cross-section of a structured optical element.

To avoid both non-linearity and crowning, a preferred optical element 70, shown in FIG. 9, includes a mixing layer 72 adjacent to the scintillator block 21, an unstructured cap layer 74 adjacent to the photomultiplier tubes 19A–D, a structured outer layer 76 adjacent to the cap layer 74, and a structured inner layer 78 between the mixing layer 72 and the structured outer layer 76. The three layers are all made of an optically transparent medium.

The mixing layer 72 of the optical element 70 is a layer of transparent material between approximately 0.05 and 0.12 inches thick, and preferably 0.06 inches thick. This mixing layer 72 permits light to mix freely for a short distance before entering the structured inner layer 78.

Figure 10:
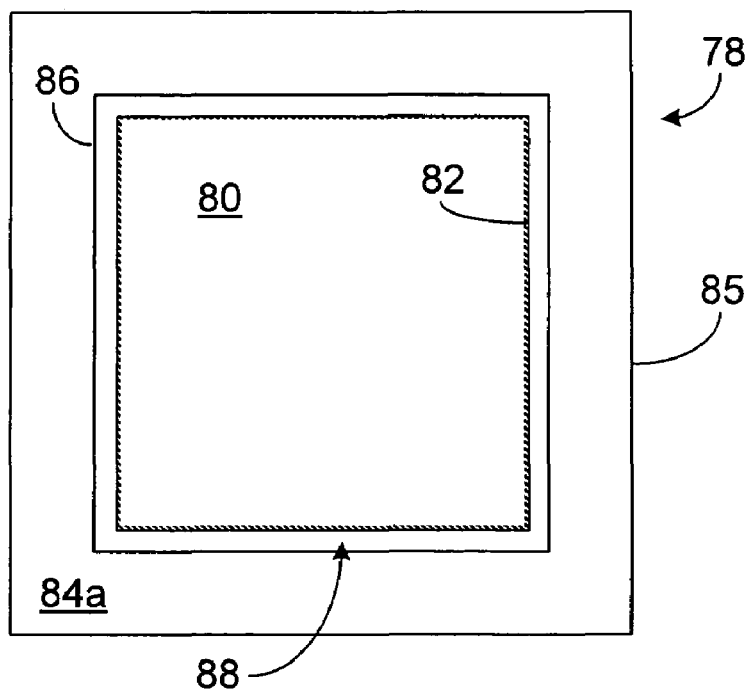
FIGS. 10, 11, and 12 are plan views of exemplary structured inner layers of the optical element of FIG. 9 taken along the line 10—10.

Referring to FIG. 10, one embodiment of the structured inner layer 78 includes an optically transparent central region 80 having an outer wall 82 extending parallel to the sides of the optical element 70 and an optically transparent peripheral region 84A adjacent to a perimeter 85 of the structured inner layer 78. The peripheral region 84A has an inner wall 86 extending parallel to, but spaced apart from, the outer wall 82 of the central region 80. The inner and outer walls 86, 82 thus define a gap 88 that separates the central region 80 from the peripheral region 84A. The gap 88 can be filled with air or a material having an index of refraction different from that of the optically transparent medium, thereby promoting total internal reflection within the central region 80 and the peripheral region 84A. The width of the gap 88 is not critical, however it should be greater than a wavelength to suppress coupling across the gap 88.

In general, it is desirable for a scintillation photon to proceed from the pillar 23, directly across both the structured inner layer 78 and the structured outer layer 76, and into the photomultiplier tube 19B closest to the pillar. This will provide the most accurate indication of the location of the gamma ray event that resulted in that scintillation photon. However, in the embodiment shown in FIG. 10, it is possible for a scintillation photon entering the peripheral region 84A from a pillar 23 to reflect off the inner wall 86 several times, thereby causing it to traverse a circuitous route that takes it far away from its point of entry into the peripheral region 84A. In so doing, such a photon may not reach a photomultiplier tube 19A–D until it has traveled some distance, along a circuitous route, from that pillar 23. In many cases, this causes the scintillation photon to exit the structured outer layer 76 at a point far away from where it entered the structured outer layer 76.

Figure 11:
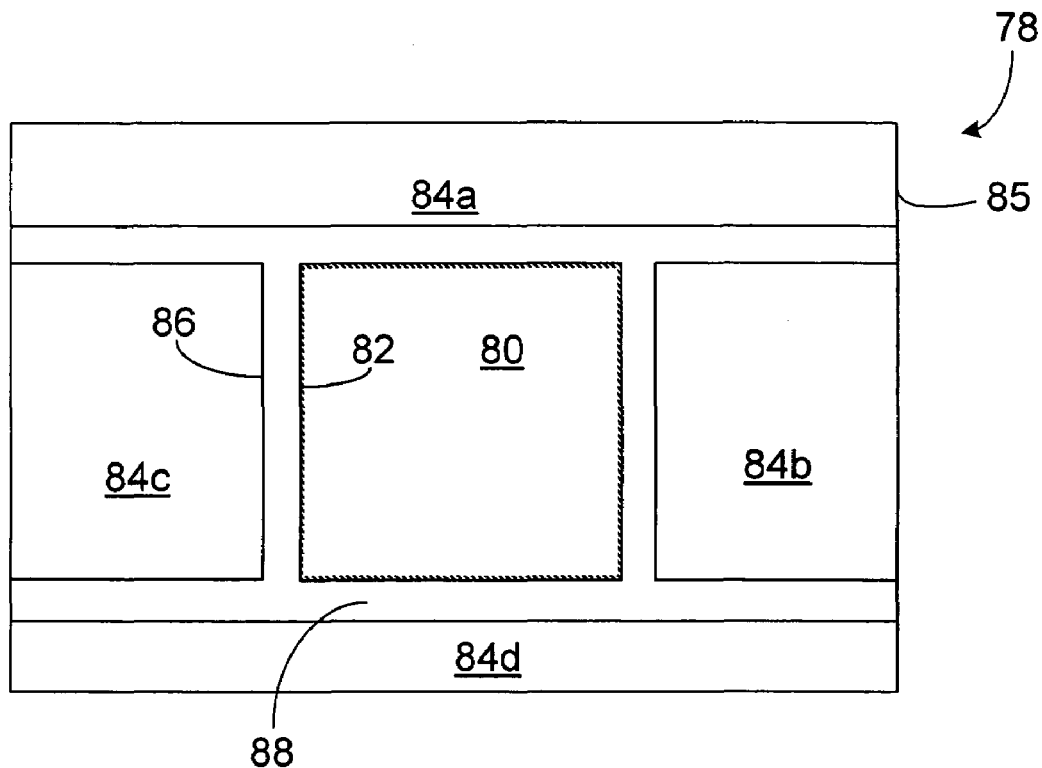
Figure 12:
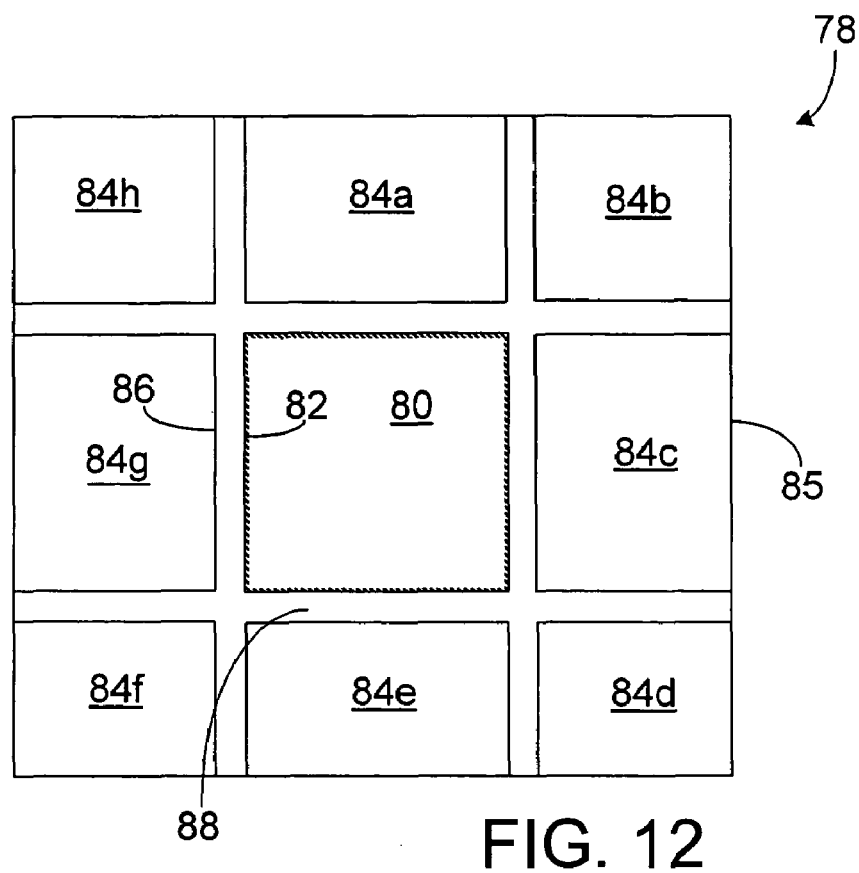

To prevent the scintillation photons from straying too far from their origins, embodiments such as those shown in FIGS. 11 and 12 surround the central region 80 with several peripheral regions 84A–D, 84A–H, each of which is adjacent to a portion of the optical element's perimeter 85. Each of the peripheral regions 84A–D, 84A–H is separated from neighboring peripheral regions by inner and outer walls 82, 86 having optical properties like those discussed in connection with FIG. 10. These walls trap the scintillation photons, thereby preventing them from straying too far from the pillar 23 in which they were generated.

The structured outer layer shown FIG. 12 contains more distinct peripheral regions 84A–H than does the structured outer layer shown in FIG. 11. For this reason, the structured outer layer of FIG. 12 more effectively confines scintillation photons than does the structured outer layer of FIG. 11.

The gap 88 can be spaced apart from the walls of the optical element 70 so as to coincide with the boundaries of the pillars 23 that lie underneath the peripheral region 84A. This is advantageous because all photons emerging from the same pillar will then be subjected to the same physical environment. However, this is not required. The gap 88 can, for example, bisect a pillar 23.

The inner wall 86 of the peripheral region 84A is highly polished, so that scintillation photons in the peripheral region 84A that are incident on the inner wall 86 are specularly reflected. In contrast, the outer wall 82 of the central region 80 is roughened, so that scintillation photons in the central region 80 that are incident on the outer wall 82 are reflected in a random direction. As a result, the probability that a scintillation photon in the peripheral region 84A will reach the photomultiplier tube is greater than the probability that a scintillation photon in the central region 80 will reach the photomultiplier tube. This tends to enhance the response of the photomultiplier tubes 19 to scintillation photons in the peripheral region 84A relative to the response of the photomultiplier tubes 19 to scintillation photons in the central region 80.

The dashed line 68 in FIG. 8C can be interpreted as a probability density function indicative of the likelihood that a scintillation photon originating at a particular value of the second coordinate will reach a photomultiplier tube 19A–D. In the conventional optical element, the probability density function 68 is non-uniform because scintillation photons originating in the central region 80 more likely to reach the photomultiplier tube 19A–D than are scintillation photons originating in the peripheral region 84A. The structured inner layer 78, by encouraging photons from the peripheral region 84A to reach the photomultiplier tubes 19A–D and simultaneously discouraging scintillation photons from the central region 80 from reaching the photomultiplier tubes 19A–D, tends to flatten the probability density function 68. This tends to make the sum of the first and second photomultiplier signals independent of the second coordinate.

Figure 13:
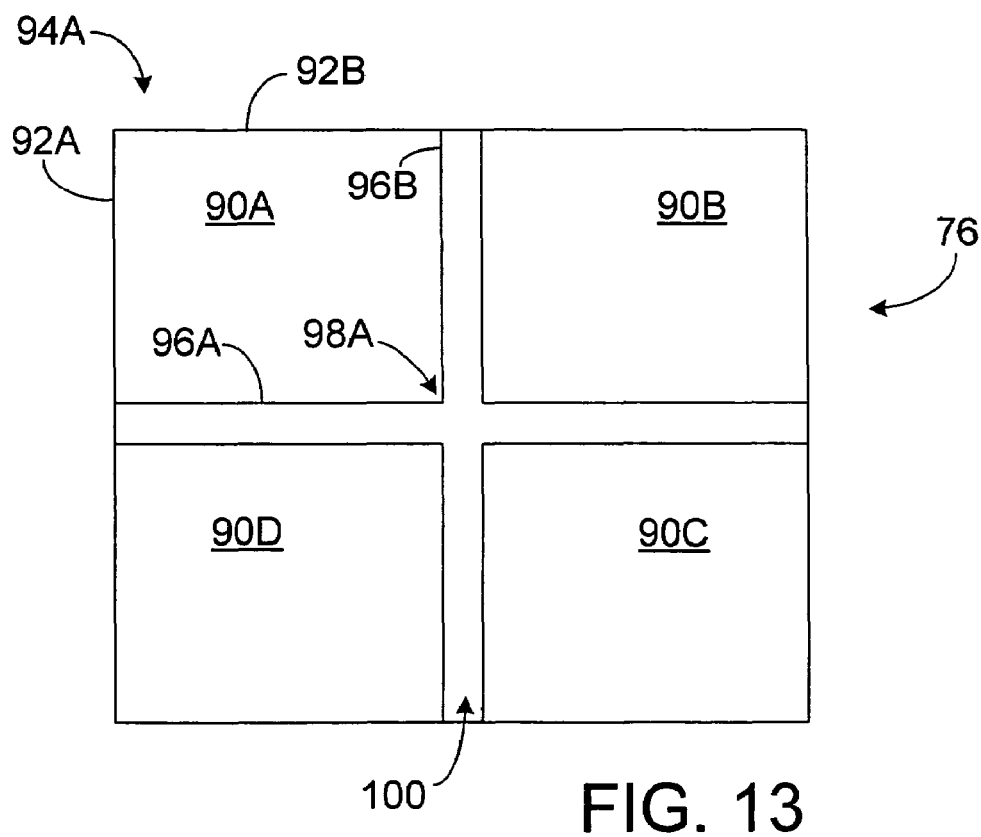
FIGS. 13, 14, and 15 are plan views of exemplary structured outer layers of the optical element of FIG. 9 taken along the line 11—11.

The structured outer layer 76 is intended to cause the photomultipliers to collectively respond as shown in FIGS. 8A and 8B. Such a linear response is desirable because it simplifies the task of calibrating the photomultipliers. Referring now to FIG. 13, the structured outer layer 76 of the optical element 70 is made up of four optically transparent quadrants 90A–D, one corresponding to each photomultiplier tube 19A–D. Each quadrant 90A–D has two outer walls 92A, 92B that meet at an exterior corner 94A and two inner walls 96A, 96B that meet at an interior corner 98A. The inner walls 96A, 96B of each quadrant 90A–D are highly polished so that scintillation photons incident thereon are specularly reflected.

Figure 14:
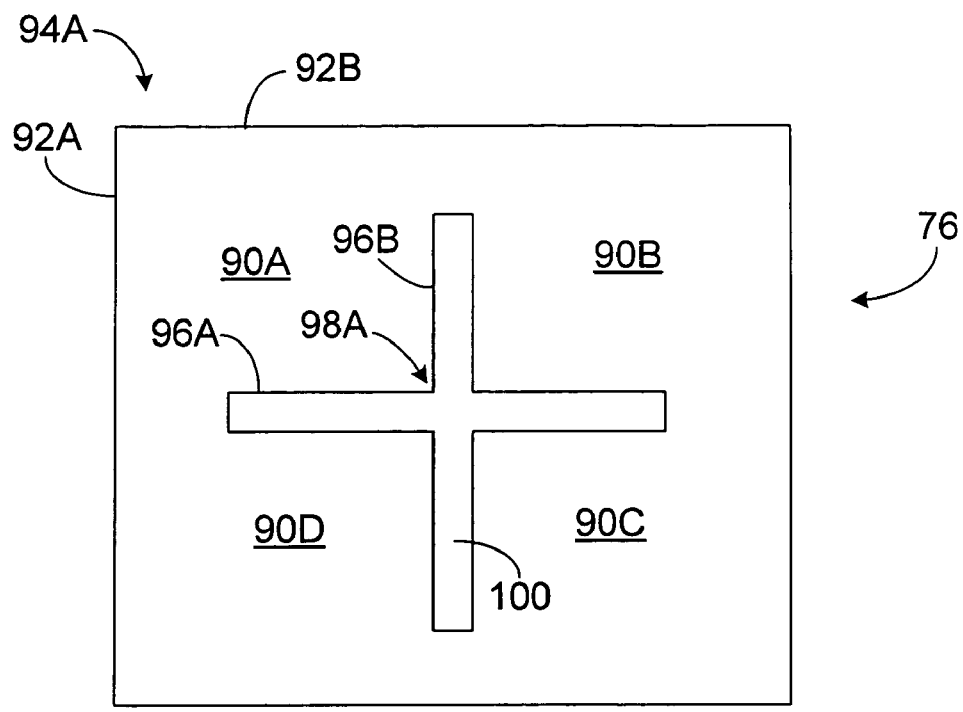
Figure 15:
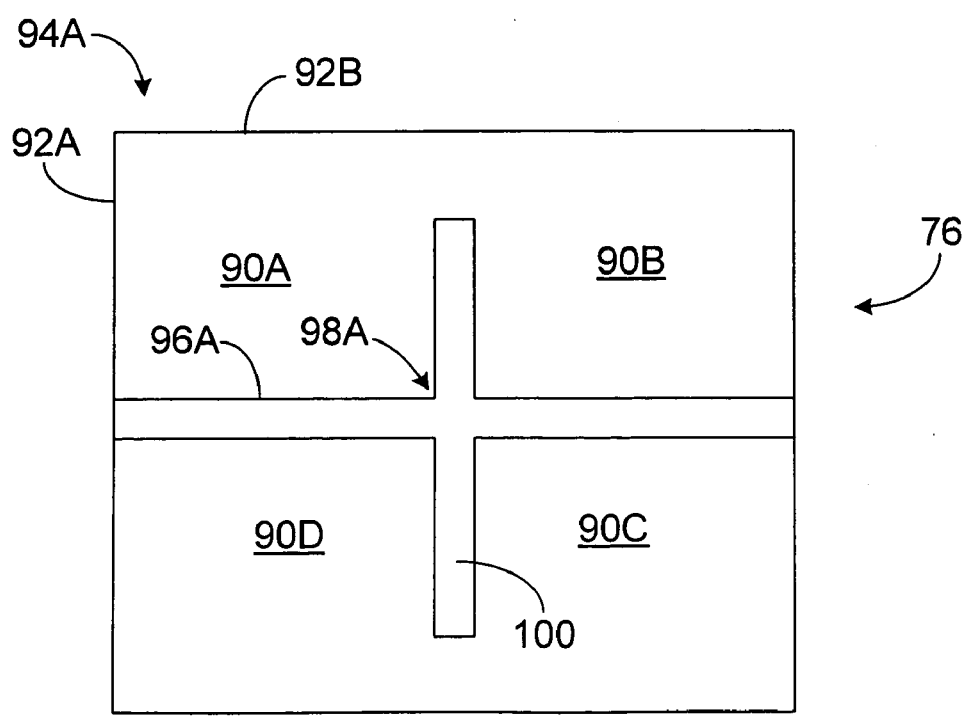

Collectively, the inner walls 96A, 96B of all four quadrants 90A–D form a cruciform gap 100 extending in the directions of both the major axis and the minor axis. The gap 100 can extend all the way across the structured outer layer 76 as shown in FIG. 13, only part way across in both directions, as shown in FIG. 14, or part way across in one direction and all the way across in the other direction, as shown in FIG. 15.

The cruciform gap 100 can be filled with air or a material having an index of refraction different from that of the optically transmitting medium, thereby promoting total internal reflection within each quadrant 90A–D. The width of the gap 100 is not critical, however it should be greater than a wavelength to suppress coupling across the gap 100.

For example, in one embodiment, the structured inner layer 78 is 0.923 inches (16.8 mm) thick and the total thickness of the optical element 70 is 1.573 inches (39.9 mm). An optically transmissive layer 102, like the mixing layer 72, is optionally placed between the structured outer layer 76 and the structured inner layer 78. This optional layer 102 is approximately 0.15 inches (3.8 mm) thick. The length and width of the optical element 70 are 3.21 inches (81.8 mm) and 2.695 inches (94.4 mm) respectively. The cap layer 74 of optically transparent material can be placed over the structured outer layer 76, thereby preventing foreign matter from falling into the cruciform gap 100. This cap layer 74 is between 0.06 inches and 0.12 inches.

In the embodiment described herein, there are four photomultiplier tubes 19A–D arranged in a grid. Hence, there are four regions 90A–D within the structured outer layer 76. The regions are disposed on the structured outer layer 76 so that each region 90A faces one 19A of the four photomultiplier tubes 19A–D. The resulting gap between the regions is thus a cruciform gap 100.

In other embodiments, there may be more than four photomultiplier tubes arranged in a rectangular array. In such cases, there will be a corresponding number of regions within the structured outer layer 76, with each region facing a corresponding photomultiplier tube. The resulting gap between regions will then define a grid. The walls defining the gap are highly polished so that scintillation photons incident on a wall from a particular region are specularly reflected back into that region.

In embodiments having many photomultiplier tubes, an structured inner layer 78 can have several nested peripheral regions surrounding the central region. These additional regions are shaped like the peripheral region and are separated from each other by gaps. Each gap has an inward-facing wall and an outward-facing wall. The inward-facing wall is roughened to discourage specular reflection and the outward-facing wall is highly polished to encourage specular reflection. The degree of roughening and polishing of each pair of inward-facing and outward-facing walls can change from one pair to the next, thereby enabling one to tune the structured inner layer to achieve the flattest possible response.

Figure 16:
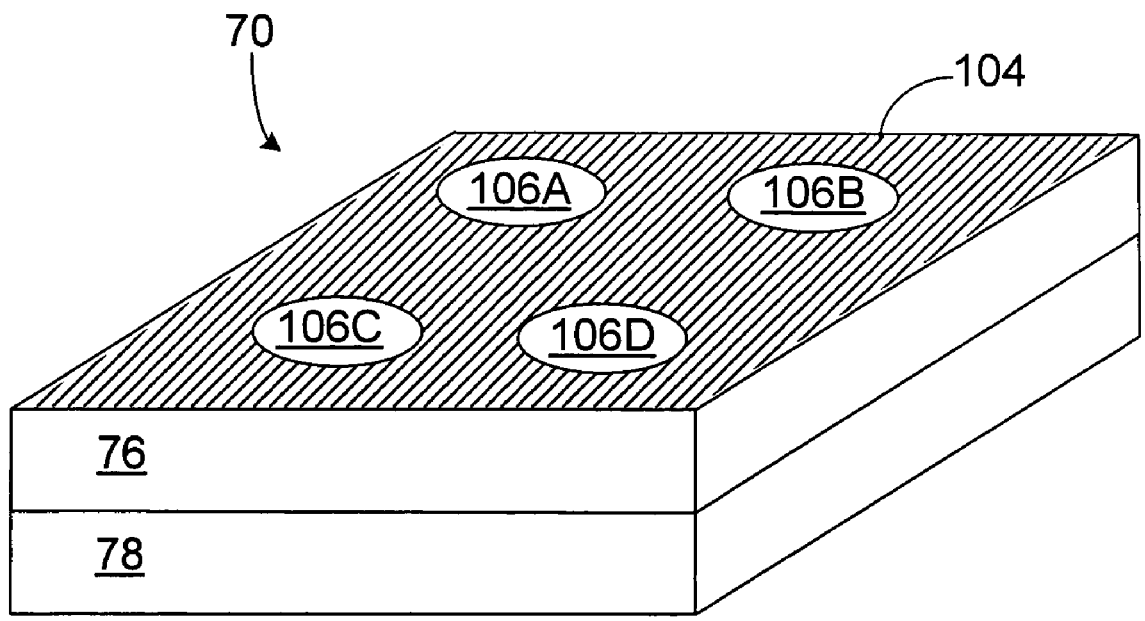
FIG. 16 is a mask disposed on the optical element.

In some embodiments, a mask placed between the structured outer layer 76 and the photomultiplier tubes 19A–D covers selected portions of the structured outer layer 76. An exemplary mask 104, shown in FIG. 16, has openings 106A–D sized to correspond to the photomultiplier tubes 19A–D. These openings 106A–D allow passage of scintillation photons only from directly beneath each photomultiplier tube 19A–D. Scintillation photons that would otherwise emerge between photomultiplier tubes 19A–D are blocked by the mask 104.

Scintillation photons that would otherwise reach the photomultiplier tubes from regions of the structured outer layer 76 that lie between the photomultiplier tubes 19A–D are often those that have undergone multiple reflections. As a result, these scintillation photons no longer provide information indicative of their origins. To more efficiently absorb these scintillation photons, the mask 104 can be made black.

The optical element 70 can be formed by casting a single monolithic block integrating the individual layers. Alternatively, the optical element 70 can be formed by casting the individual layers. The layers are then glued together with an index matching adhesive between the layers. In either case, removal of the structured outer layer 76 and the structured inner layer 78 from the mold is facilitated by providing rectangular and cruciform gaps 88,100 having a V-shaped profile.

Having described the invention, and a preferred embodiment thereof, what we claim as new and secured by Letters Patent is:

What is claimed is:

1. A PET scanner comprising:
   a scintillator block;
   a plurality of photodetectors;
   an optical element disposed between the scintillator block and the plurality of photodetectors, the optical element having:
      a first layer that includes a central region having an outer wall and a peripheral region having an inner wall, the inner and outer wall being separated by a first gap; and
      a second layer in optical communication with the first layer, the second layer including at least a first region and a second region, the first region having a first interior wall and the second region having a second interior wall opposite the first interior wall, the first and second interior walls being separated by a second gap.

2. The PET scanner of claim 1, wherein the first layer comprises a perimeter wall, and the peripheral region is adjacent to at least a portion of the perimeter wall.

3. The PET scanner of claim 1, wherein the peripheral region is adjacent to the entire perimeter wall.

4. The PET scanner of claim 1, further comprising one or more additional peripheral regions, the one or more additional peripheral regions being adjacent to a portion of the perimeter wall that is not adjacent to the peripheral region.

5. The PET scanner of claim 4, wherein an additional peripheral region is separated from the peripheral region by a gap.

6. The PET scanner of claim 5, wherein the gap extends to the perimeter wall.

7. The PET scanner of claim 1, wherein the inner wall and the outer wall have different optical characteristics.

8. The PET scanner of claim 7, wherein one of the inner wall and the outer wall is polished and the other is unpolished.

9. The PET scanner of claim 7, wherein one of the inner wall and the outer wall is opaque and the other is not opaque.

10. The PET scanner of claim 7, wherein one of the inner wall and the outer wall is black and the other is not black.

11. The PET scanner of claim 7, wherein one of the inner wall and the outer wall is transparent and the other is not transparent.

12. The PET scanner of claim 7, wherein one of the inner wall and the outer wall is translucent and the other is not translucent.

13. The PET scanner of claim 7, wherein one of the inner wall and the outer wall is absorbtive and the other is not absorbtive.

14. The PET scanner of claim 7, wherein one of the inner wall and the outer wall is configured to cause a specular reflection and the other is cause a reflection other than a specular reflection.

15. The PET scanner of claim 14, wherein the one of the inner wall and the outer wall that is configured to cause a specular reflection comprises a metal coating.

16. The PET scanner of claim 14, wherein the one of the inner wall and the outer wall that is configured to cause a specular reflection comprises a reflective coating.

17. The PET scanner of claim 14, wherein the one of the inner wall and the outer wall that is configured to cause a specular reflection has an index of refraction selected to cause total internal reflection of light incident thereon.

18. The PET scanner of claim 7, wherein one of the inner wall and the outer wall is configured to cause a diffuse reflection and the other is cause a reflection other than a diffuse reflection.

19. The PET scanner of claim 18, wherein the one of the inner wall and the outer wall that is configured to cause a diffuse reflection comprises a plastic coating.

20. The PET scanner of claim 18, wherein the one of the inner wall and the outer wall that is configured to cause a diffuse reflection comprises a coating of paint.

21. The PET scanner of claim 18, wherein the one of the inner wall and the outer wall that is configured to cause a diffuse reflection has a roughened surface.

22. The PET scanner of claim 7, wherein a surface of the inner wall is polished.

23. The PET scanner of claim 7, wherein an inner surface of the outer wall is roughened.

24. The PET scanner of claim 1, wherein the optical element further comprises a third layer disposed adjacent to the scintillator block.

25. The PET scanner of claim 1, wherein the first gap has an optical property that is different from a corresponding optical property of the central region and the peripheral region.

26. The PET scanner of claim 25, wherein the first gap comprises an air gap.

27. The PET scanner of claim 1, wherein one of the first interior wall and the second interior wall is polished and the other is unpolished.

28. The PET scanner of claim 1, wherein one of the first interior wall and the second interior wall is opaque and the other is not opaque.

29. The PET scanner of claim 1, wherein one of the first interior wall and the second interior wall is black and the other is not black.

30. The PET scanner of claim 1, wherein the first interior wall and the second interior wall are specularly reflecting walls.

31. The PET scanner of claim 1, wherein the second gap defines a grid of regions.

32. The PET scanner of claim 31, wherein the second gap extends across the second layer.

33. The PET scanner of claim 31, wherein the second gap extends part way across the second layer.

34. The PET scanner of claim 31, wherein each region in the grid of regions is positioned to correspond to a photodetector from the plurality of photodetectors.

35. The PET scanner of claim 1, wherein the opposed first and second interior walls are parallel.

36. The PET scanner of claim 1, wherein the opposed first and second interior walls are not parallel.

37. The PET scanner of claim 1, wherein the second gap is a cruciform gap.

38. The PET scanner of claim 37, wherein the cruciform gap comprises intersecting first and second arms, at least one of the first and second arms extending across the second layer.

39. The PET scanner of claim 37, wherein the cruciform gap comprises intersecting first and second arms, the first and second arms extending part way across the second layer.

40. The PET scanner of claim 1, further comprising a mask disposed to prevent scintillation photons emerging from selected portions of the optical element from reaching the photodetectors.

41. The PET scanner of claim 40, wherein the mask comprises regions forming apertures at locations opposite the photodetectors.

42. The PET scanner of claim 40, wherein the mask is disposed between the optical element and the photodetectors.

43. The PET scanner of claim 40, wherein the mask is absorbtive.

44. The PET scanner of claim 40, wherein the mask is reflective.

45. The PET scanner of claim 44, wherein the mask is specularly reflective.

46. The PET scanner of claim 44, wherein the mask is diffusely reflective.

47. An optical element for directing light from a scintillator block to a plurality of photodetectors, the optical element comprising:
a first layer in optical communication with the scintillator block, the first layer having a central region having an outer wall and a peripheral region having an inner wall, the inner and outer wall being separated by a first gap; and
a second layer in optical communication with the plurality of photodetectors and with the first layer, the second layer including at least a first region and a second region, the first region having a first interior wall and the second region having a second interior wall opposite the first interior wall, the first and second interior walls being separated by a second gap.

48. The optical element of claim 47, wherein the inner wall and the outer wall are configured such that a photon incident on the inner wall from the peripheral region encounters a first reflection coefficient that is greater than a second reflection coefficient encountered by a photon incident on the outer wall from the central region.

49. The optical element of claim 47, wherein an inner surface of the inner wall of the peripheral region has a greater reflection coefficient than an inner surface of the outer wall of the central region.

50. The optical element of claim 49, wherein the inner surface of the inner wall is polished.

51. The optical element of claim 49, wherein the inner surface of the outer wall is roughened.

52. The optical element of claim 47, wherein the optical element further comprises a third layer disposed facing the scintillator block.

53. The optical element of claim 47, wherein the first gap comprises an air gap.

54. The optical element of claim 47, wherein the first interior wall and the second interior wall are specularly reflecting walls.

55. The optical element of claim 47, wherein the second gap defines a grid of regions.

56. The optical element of claim 55, wherein each region in the grid of regions is positioned to correspond to a photodetector from the plurality of photodetectors.

57. The optical element of claim 47, wherein the second gap is a cruciform gap.

* * * * *

UNITED STATES PATENT AND TRADEMARK OFFICE
CERTIFICATE OF CORRECTION

PATENT NO. : 6,992,295 B2
APPLICATION NO. : 10/695264
DATED : January 31, 2006
INVENTOR(S) : Leonid Romanov, Paul Domigan and Olof Johnson It is certified that error appears in the above-identified patent and that said Letters Patent is hereby corrected as shown below:

In column 12, claim 3, please correct the claim as follows:

3. The PET scanner of claim [[1]] 2, wherein the peripheral region is adjacent to the entire perimeter wall.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 6,992,295 B2  Page 1 of 1
APPLICATION NO. : 10/695264
DATED : January 31, 2006
INVENTOR(S) : Leonid Romanov, Paul Domigan and Olof Johnson It is certified that error appears in the above-identified patent and that said Letters Patent is hereby corrected as shown below:

In column 12, claim 3, lines 18 and 19 please correct the claim as follows:

3. The PET scanner of claim 2, wherein the peripheral region is adjacent to the entire perimeter wall.

This certificate supersedes the Certificate of Correction issued July 1, 2008.

Signed and Sealed this

Twenty-second Day of July, 2008

JON W. DUDAS
*Director of the United States Patent and Trademark Office*